Jan. 5, 1971     J. W. BRACKEN, JR     3,552,804

DAMPED SHAFT ASSEMBLY

Filed Nov. 4, 1968

INVENTOR.
Joseph W. Bracken, Jr.
BY
Paul Fitzpatrick
ATTORNEY

United States Patent Office 3,552,804
Patented Jan. 5, 1971

3,552,804
DAMPED SHAFT ASSEMBLY
Joseph W. Bracken, Jr., Redford Township, Mich., assignor to General Motors Corporation, Detroit, Mich., a corporation of Delaware
Filed Nov. 4, 1968, Ser. No. 773,063
Int. Cl. F16f 15/16
U.S. Cl. 308—1
10 Claims

ABSTRACT OF THE DISCLOSURE

A long thin shaft is inherently damped against vibration which would otherwise occur at critical speeds of the shaft by virtue of a hollow shaft enclosing and rotating with the shaft and slightly spaced from it, with a damping material filling the space between the two shafts.

My invention is directed to shafts, and particularly to a shaft which has no critical speed. In many installations, particularly such as gas turbines, where one shaft runs through the interior of another shaft and the inner shaft must rotate at high speeds, it may pass through its critical speed at some phase of operation of the machine. At the critical speed, which is the speed at which the rate of rotation of the shaft equals its natural frequency of vibration with nodes at the supports for the shaft, excessive and dangerous vibration will ordinarily occur. Many arrangements for damping such vibration by friction, viscous action, and otherwise have been proposed. Also, in some cases the shaft may be dimensioned so that its critical speed is outside the range of operating speeds. Or, steady bearings may raise the critical speed.

My invention is directed to providing a relatively long slender shaft assembly of such structure that it inherently is damped against excessive vibration. Briefly, this is accomplished by providing a shaft assembly in which the load carrying shaft is enclosed by a hollow shaft or sleeve which rotates with it. A very slight clearance between the shafts is filled with some viscous damping medium. The outer shaft or sleeve has a significantly higher critical frequency than the inner shaft. As a result, the inner shaft first reaches its critical speed and, if speed is increased sufficiently, the outer shaft reaches its critical speed. However, at the critical speed of each of the shafts, the other shaft is sufficiently remote from its critical speed that it has no significant tendency to vibrate. Relative vibration between the two shafts is damped by the viscous medium between them so that vibration of each of the two shafts is damped by the other shaft and the viscous medium.

The nature of my invention and its advantages will be more clearly apparent to those skilled in the art from the succeeding detailed description of a preferred embodiment of the invention and the accompanying drawings thereof.

Referring to the drawings, FIG. 1 is a view of a shaft assembly with parts cut away and in section.

The critical speed of a rotating shaft is the speed at which its elastic forces are completely neutralized so that it is incapable of offering any resistance to deflecting force. This speed is equal numerically to the frequency of vibration of the shaft, with the masses mounted on it, if deflected by an external force while the shaft is at a standstill. Its value depends on the length of the shaft, its various diameters, the manner in which it is supported, and on the magnitude and distribution of the loads it carries, if any. There are also higher critical speeds above the lowest critical speed. We need not consider these further here. In the succeeding discussion, we will be concerned with a shaft which carries no external load. However, the principles of the invention can be applied to a shaft bearing loads mounted upon it.

Figure 1:
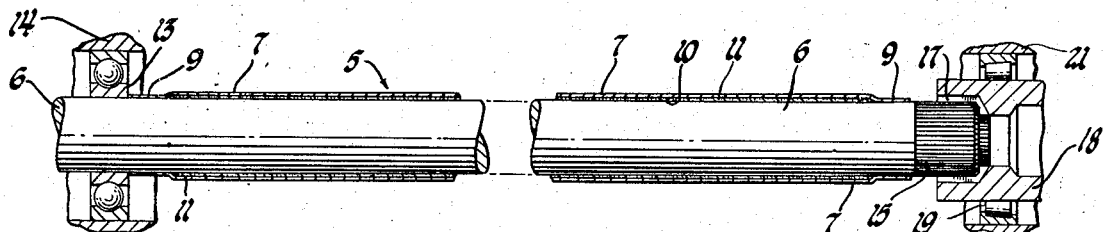

Referring first to FIG. 1, the shaft assembly 5 comprises an inner shaft 6, which may be solid or hollow as desired, and an outer shaft or sleeve 7. The outer shaft 7 is in sealing contact with the inner shaft at the two end portions 9 so as to retain a viscous damping material in the clearance between the shaft. This clearance defines an elongated annular chamber 10 filled with a viscous damping material 11. The sleeve 7 is in sufficiently tight contact with the shaft 6 at one of the points 9 so that the two shafts rotate together and thus have the same rotational speed at all times.

If shaft 6 is solid, sleeve 7 will obviously have a substantially higher critical speed or natural frequency of vibration shaft 6 and, if shaft 6 is hollow, it may readily be designed so that the critical speeds of the two shafts 6 and 7 are significantly different. Thus, assuming the shaft assembly to be accelerated from rest, as the speed increases the shaft 6 will reach its critical speed at a point well below the critical speed of shaft 7. Any tendency of shaft 6 to vibrate excessively is damped by the thin layer of damping material between it and shaft 7. If the speed of the shaft assembly increases to the point that it reaches the critical speed of outer shaft 7 it will be well beyond the critical speed of shaft 6, which acts through the viscous material to damp vibration of shaft 7. The clearance between the two shafts should be slight for most effective damping but should be sufficient to prevent actual contact been the shafts intermediate the end portions 9 at subcritical speeds. I believe that the clearance should be of the order of 0.002 to 0.010 inch when the usual damping materials such as heavy silicone or petroleum oils and the like are used.

As pointed out, there needs to be some closure between shafts 6 and 7 at the points 9. This closure may be affected by brazing, by swaging the outer shaft, by magnetic deformation of the outer shaft, by dimensioning the outer shaft so as to be a press fit on the inner shaft, by the use of O ring seal, or by any other suitable method of sealing which will couple the shafts for rotation together and prevent loss of the damping material.

In the structure shown and in all preferred structures, the diameter of shaft 6 at the points 9 is no greater than the smallest radius of the shaft between these ponts so that centrifugal force tends to retain the damping material rather than to urge it from the assembly at the points 9. The small clearance between the two shafts is not shown to scale on the drawings. Normally this clearance of the order of 0.002 to 0.010 inch is substantially less than the thickness of the outer sleeve which might, for example, be of the order of 0.025 inch, or any value suited to the particular installation.

Figures 2, 3:
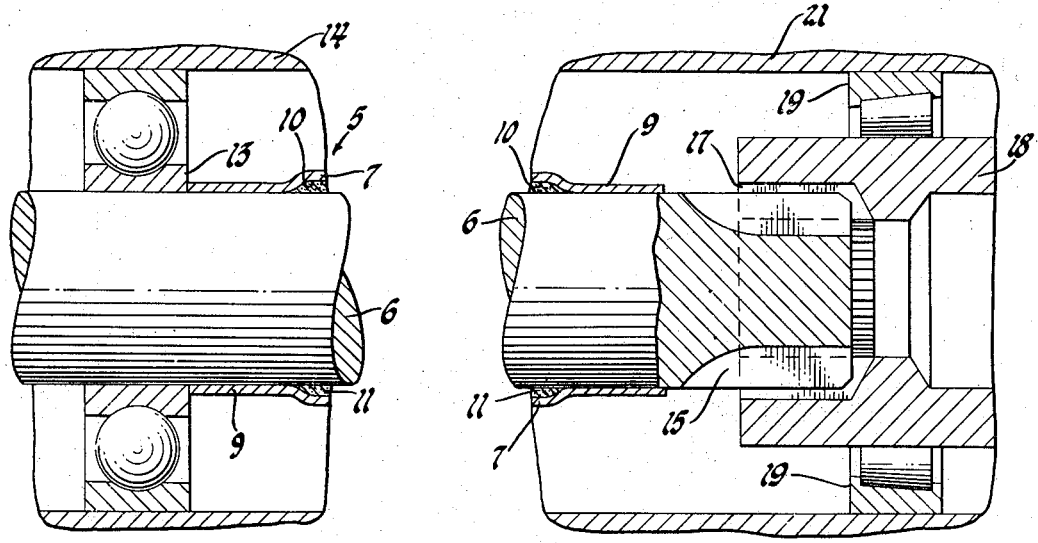
FIG. 2 illustrates a ball bearing support for an end of a shaft as shown in FIG. 1.
FIG. 3 illustrates a splined connection to a roller bearing support for such a shaft.
Figure 4:
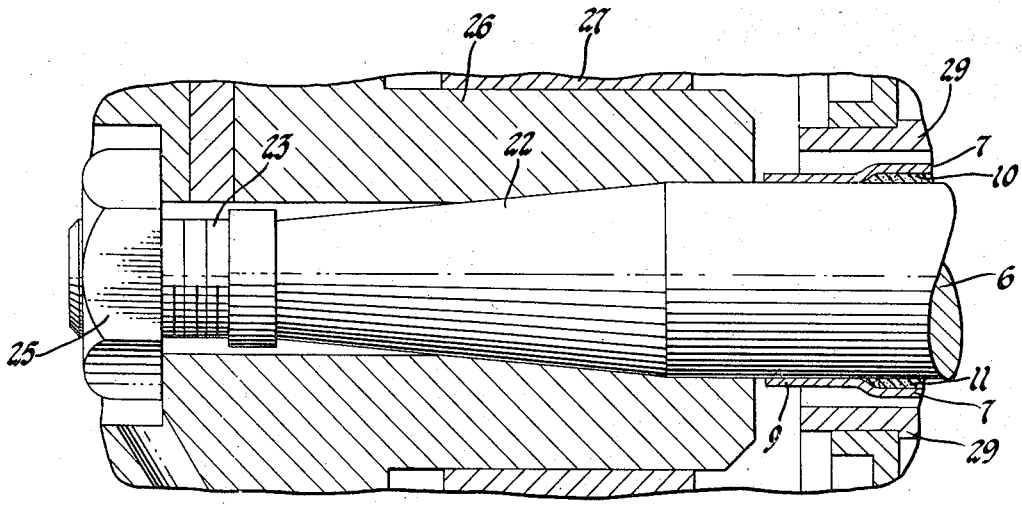
FIG. 4 illustrates a piloted support for a shaft into another rotating shaft.

As mentioned above, the critical frequency depends to some extent upon the type of supports for the ends of the shaft. However, the principles of the invention apply with any normal structure of this purpose. FIGS. 2, 3, and 4 illustrate typical supports for the damped shaft of the invention. In FIG. 2, the end portion of shaft 6 extending beyond the shaft 7 is mounted in a ball bearing 13 which is supported in any suitable shaft housing indicated at 14. In FIG. 3, the inner shaft 6 has a splined end portion 15 which is received in spline 17 in a shaft 18 rotatably mounted in a roller bearing 19 having a support 21. It will be understood that both ends of the shaft may have supports such as illustrated in FIGS. 2 and 3 or the ends may be diversely mounted.

FIG. 4 illustrates the application of my invention to a quill shaft used to connect a gas generator turbine to accessories driven by it or to a power transfer gear, this being as employed in the engine described in U.S. Pat. No. 3,490,746. In this case, the shaft 6 is provided with a tapered end portion 22 the end of which is threaded at 23 for a nut 25. The tapered portion 22 is received in a tapered socket in the power turbine portion 22 is received in a tapered socket in the power turbine shaft 26, which is mounted in a bearing 27. Shaft 6 is a long relatively thin shaft extending through a power turbine to a reduction gear box of the engine within a fixed member 29.

As will be understood, various materials having viscous damping properties may be used between the two shafts. The material need not be something which is liquid, for example, various elastomeric materials exhibit a high degree of viscous damping although they are not liquid. The choice of material will depend upon the environment but, for the relatively high temperature environment within a turbine, a heavy silicone oil is considered to be en excellent choice for a damping medium. It should be noted that the damping characteristic is best when the outer shaft 7 extends substantially from one support to the other without any great space between the outer shaft 7 and whatever supports the inner shaft 6. Thus, in effect, the ends of the outer shaft 7 are supported by the support for shaft 6 through a relatively small and inflexible portion of shaft 6. Of course, the bearing or the like could be mounted upon the end portion 9 of the outer shaft, but this seems less practicable.

The assembly of the shaft presents no particular problem. The shaft 6 is fitted into the shaft 7 which contains within it sufficient of the damping medium to fill the chamber between them. A press fit, or whatever other expedient may be employed to assure the close fit between the ends, completes the joint between the two parts. Preferably at one end, at least, the fixation is quite rigid such as a spot welded, brazed or tightly swaged joint, swaging including swaging by magnetic deformation.

If there is a problem due to relative expansion of the damping medium and the metal parts of the shaft, this may be accommodated by not quite filling the void between the two shafts or by a lobed or fluted configuration of the outer shaft so that it may readily expand by exertion of pressure on it by the damping medium.

The detailed description of the preferred embodiment of the invention for the purpose of explaining the principle thereof is not be considered as limiting or restricting the invention since many modifications may be made by the exercise of skill in the art.

I claim:
1. An installation of a rotating shaft assembly having such a relation between its range of rotational speed in operation and the overall dimensional characteristics of the shaft assembly that a rigid unitary elastic shaft of the same dimensional characteristics would have a critical speed within the said range, the shaft assembly having inherent damping and comprising, in combination, an inner shaft; a hollow outer shaft substantially coaxial with, rotating with, and enclosing the inner shaft, the shafts being sealed together at two axially spaced points and being very slightly spaced throughout a substantial axial span between said points to define an elongate annular chamber, and being fixed together for concurrent rotation; and a viscous vibration-damping material filling the chamber; the critical speed of at least one of the shafts being within the said speed range and the critical speeds of the two shafts being substantially different, so that each shaft acts with the damping material to damp vibration of the other shaft when the assembly is rotated at the critical speed of the said other shaft.

2. An installation as recited in claim 1 in which the radial clearance betwen the shafts in the chamber is of the order of 0.002 to 0.010 inch.

3. An installation as recited in claim 1 in which the damping material is a heavy silicone oil.

4. An installation as recited in claim 1 in which the shafts are rigidly coupled together at the said axially spaced points.

5. An installation as recited in claim 1 in combination with supports for the inner shaft adjacent the ends of the said span.

6. An installation of a rotating shaft assembly having such a relation between its range of rotational speed in operation and the overall dimensional characteristics of the shaft assembly that a rigid unitary elastic shaft of the same dimensional characteristics would have a critical speed within the said range, the assembly having inherent damping and comprising, in combination, an inner shaft; a hollow outer shaft substantially coaxial with, rotating with, and enclosing the inner shaft, the shafts being sealed together at two axially spaced points and being very slightly spaced throughout a substantial axial span between said points to define an elongate annular chamber, and being fixed together for concurrent rotation; a viscous vibration-damping material filling the chamber; the critical speed of at least one of said shafts being within the said speed range and the critical speeds of the two shafts being substantially different, so that each shaft acts with the damping material to damp vibration of the other shaft when the assembly is rotated at the critical speed of the said other shaft; and means rotatably supporting the shafts adjacent the said points.

7. An installation as recited in claim 6 in which the radial clearance between the shafts in the chamber is of the order of 0.002 to 0.010 inch.

8. An installation as recited in claim 6 in which the damping material is a heavy silicone oil.

9. An installation as recited in claim 6 in which the shafts are rigidly coupled together at the said axially spaced points.

10. An installation as recited in claim 6 in which the supporting means directly supports the inner shaft and the inner shaft supports the outer shaft.

References Cited
UNITED STATES PATENTS 3,058,559  10/1962  Ohrnberger _____ 74—574X MANUEL A. ANTONAKAS, Primary Examiner U.S. Cl. X.R.

74—574